(12) United States Patent
Baek (10) Patent No.: US 12,240,371 B2
(45) Date of Patent: Mar. 4, 2025

(54) VEHICLE INCLUDING HEADLAMP AND METHOD OF CONTROLLING A VEHICLE HEADLAMP

(71) Applicants: Hyundai Motor Company, Seoul (KR); Kia Corporation, Seoul (KR)

(72) Inventor: Jei Hyun Baek, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/992,187

(22) Filed: Nov. 22, 2022

(65) Prior Publication Data

US 2023/0182638 A1    Jun. 15, 2023

(30) Foreign Application Priority Data

Dec. 14, 2021    (KR) .................. 10-2021-0178995

(51) Int. Cl.
  *B60Q 1/14*    (2006.01)
  *F21S 41/657*  (2018.01)

(52) U.S. Cl.
  CPC ............ *B60Q 1/143* (2013.01); *F21S 41/657* (2018.01); *B60Q 2300/054* (2013.01); *B60Q 2300/13* (2013.01); *B60Q 2300/14* (2013.01)

(58) Field of Classification Search
  CPC ....... F21S 41/657; B60Q 1/143; B60Q 1/115; B60Q 1/085; B60Q 17/018; B60Q 17/019; B60Q 1/0023; B60Q 1/0035; B60Q 2300/0054; B60Q 2300/13; B60Q 2300/132; B60Q 2300/14; B60G 17/018; B60G 17/019; B60G 2204/113; B60G 2400/252
  See application file for complete search history.

(56) References Cited

U.S. PATENT DOCUMENTS

| | | | | |
|---|---|---|---|---|
| 8,206,016 | B2* | 6/2012 | Todani | ............... B60Q 1/10 362/465 |
| 10,935,203 | B2* | 3/2021 | Ekladyous | ............ B60Q 1/122 |
| 2007/0229240 | A1* | 10/2007 | Yasuda | ............ B60G 17/01933 340/442 |
| 2010/0250065 | A1* | 9/2010 | Kelly | ................... B60G 17/016 701/37 |

FOREIGN PATENT DOCUMENTS

| | | | |
|---|---|---|---|
| JP | 5260064 | B2 | 8/2013 |
| KR | 10-0775376 | B1 | 11/2007 |
| KR | 10-2019-0123874 | A | 11/2019 |

\* cited by examiner

Primary Examiner — Bryon T Gyllstrom
(74) Attorney, Agent, or Firm — Fox Rothschild LLP

(57) ABSTRACT

Disclosed herein is a vehicle that includes a headlamp configured to irradiate light forward, a plurality of suspensions coupled to each wheel of front wheels and rear wheels of the vehicle, a plurality of suspension sensors for detecting a height of each suspension of the plurality of suspensions, respectively. The vehicle may include a controller electrically connected to the headlamp, the plurality of suspensions, and the plurality of suspension sensors. In various embodiments, the controller is configured to receive a height value of each suspension of the plurality of suspensions from a corresponding sensor of the plurality of suspension sensors, and adjust a light irradiation angle of the headlamp by comparing the height values of the plurality of suspensions with a predetermined reference height.

12 Claims, 8 Drawing Sheets

| | | Front Left (FL) | Front Right (FR) | Rear Left (RL) | Rear Right (RR) |
|---|---|---|---|---|---|
| REFERENCE VALUE | SUSPENSION HEIGHT (h_r) | 421mm | 421mm | 415mm | 415mm |
| | DISTANCE FROM GROUND TO FENDER (hg_r) | 773mm | 773mm | 773mm | 773mm |
| 1 PERSON GETTING IN | SUSPENSION HEIGHT (h) | 421mm | 421mm | 415mm | 415mm |
| | DISTANCE FROM GROUND TO FENDER (hg) | 770mm | 773mm | 773mm | 770mm |
| 1 PERSON GETTING IN AND CARGO LOADING | SUSPENSION HEIGHT (h) | 422 (+1) mm | 425 (+4) mm | 413 (-2) mm | 410 (-5) mm |
| | DISTANCE FROM GROUND TO FENDER (hg) | 774 (+1) mm | 777 (+4) mm | 768 (-5) mm | 766 (-7) mm |

VEHICLE INCLUDING HEADLAMP AND METHOD OF CONTROLLING A VEHICLE HEADLAMP

CROSS-REFERENCE TO RELATED APPLICATION(S)

This application claims, under 35 U.S.C. § 119(a), the benefit of Korean Patent Application No. 10-2021-0178995, filed on Dec. 14, 2021, which application is hereby incorporated herein by reference.

BACKGROUND

1. Technical Field

The present disclosure relates to a vehicle capable of adjusting a light irradiation angle of a headlamp according to a change in a posture of the vehicle, and a method for controlling the same.

2. Background

Generally, suspension absorbs shocks from a road surface to improve riding comfort while improving driving stability and turning characteristics. Furthermore, the suspension may adjust a height of a vehicle when getting in, getting out of, or loading cargo. For example, air suspension corrects a posture of the vehicle, that is, the height of the vehicle by increasing air pressure when a person gets on or a luggage is loaded in a trunk.

Furthermore, a headlamp leveling system for automatically adjusting a light irradiation angle of a headlamp according to a situation is provided in a vehicle. However, in a situation out of the correction limit of a vehicle posture by suspension, a conventional head lamp leveling system may not properly correct the light irradiation angle of the head lamp. For example, in a certain situation, such as when an excessively heavy load is loaded in a trunk located at the rear of the vehicle, an imbalance in vehicle posture may occur in which the front of a vehicle body is raised and the rear of the vehicle body is lowered. In this case, the conventional head lamp leveling system has a disadvantage of maintaining the light irradiation direction of the head lamp while being raised.

SUMMARY

An aspect of the present disclosure is to provide a vehicle capable of appropriately adjusting a light irradiation angle of a headlamp if it exceeds the correction limit of the vehicle height by the suspension due to the loading of heavy cargo at the rear of the vehicle, and a method for controlling the same.

Further, an aspect of the present disclosure is to provide a vehicle capable of adjusting a light irradiation angle of a headlamp in consideration of a change in a height of a tire when a heavy cargo is loaded at the rear of the vehicle, and a method for controlling the same.

Additional aspects of the disclosure will be set forth in part in the description which follows and, in part, will be obvious from the description, or may be learned by practice of the disclosure.

In accordance with an aspect of the disclosure, a vehicle includes a headlamp configured to irradiate light forward, a plurality of suspensions including front suspensions and rear suspensions, each front suspension being coupled to a corresponding front wheel of the vehicle and each rear suspension being coupled to a corresponding rear wheel of the vehicle. A plurality of suspension sensors configured for detecting a height of each of the plurality of suspensions, respectively. A controller electrically connected to the headlamp, the plurality of suspensions, and the plurality of suspension sensors, wherein the controller may be configured to receive a height value of each suspension of the plurality of suspensions from a corresponding suspension sensor of the plurality of suspension sensors, and adjust a light irradiation angle of the headlamp by comparing the height values of each suspension of the plurality of suspensions with a corresponding predetermined reference height.

The controller may be further configured to detect a maximum height value among the height values of the front suspensions based on at least one of the height values of the rear suspensions being lower than the predetermined reference height, and adjust the light irradiation angle of the headlamp by using a first difference value between the maximum height value among the height values of the front suspensions and the predetermined reference height of the front suspensions.

The controller may be further configured to adjust the light irradiation angle of the headlamp downward by an amount corresponding to the first difference value with respect to the front suspensions.

The vehicle may further include a plurality of tire sensors for detecting a height of each of tires, wherein the controller is further configured to receive a height value of each of the tires from the plurality of tire sensors, determine height change values of the front tires by comparing a maximum height value among the height values of the front tires with a predetermined reference height of the front tires, and adjust the light irradiation angle of the headlamp by using the first difference value with respect to the front suspensions and the height change values of the front tires.

The controller may be further configured to adjust the light irradiation angle of the headlamp downward by the sum of the first difference value with respect to the front suspensions and the height change values of the front tires.

The controller may be further configured to calculate an average height value of the front suspensions based on the height values of the rear suspensions being higher than or equal to the predetermined reference height, and adjust the light irradiation angle of the headlamp by using a second difference value between the average height value and the reference height of the front suspensions.

The controller may be further configured to adjust the light irradiation angle of the head lamp upward or downward by the second difference value with respect to the front suspensions.

In accordance with another aspect of the disclosure, a method of controlling a vehicle headlamp includes receiving a height value of each suspension of a plurality of suspensions from a corresponding suspension sensor of a plurality of suspension sensors, and adjusting a light irradiation angle of a headlamp by comparing the height values of the plurality of suspensions with a predetermined reference height, respectively.

The adjusting the light irradiation angle of the head lamp may further include detecting a maximum height value among the height values of front suspensions of the plurality of suspensions based on at least one of the height values of rear suspensions of the plurality of suspensions being lower than the predetermined reference height, and adjusting the light irradiation angle of the headlamp by using a first difference value between the maximum height value among the height values of the front suspensions and the reference height of the front suspensions.

The light irradiation angle of the head lamp may be adjusted downward by the first difference value with respect to the front suspensions.

The method may further include receiving a height value of each tire of a plurality of tires from a corresponding tire sensor of a plurality of tire sensors, and determining height change values of front tires of the plurality of tires by comparing a maximum height value among the height values of the front tires with a predetermined reference height of the tires, wherein the light irradiation angle of the head lamp is adjusted by using the first difference value with respect to the front suspensions and the height change values of the front tires.

The light irradiation angle of the head lamp may be adjusted downward by the sum of the first difference value with respect to the front suspensions and the height change values of the front tires.

The adjusting the light irradiation angle of the head lamp may further include calculating an average height value of front suspensions of the plurality of suspensions based on the height values of rear suspensions of the plurality of suspensions being higher than or equal to the predetermined reference height, and adjusting the light irradiation angle of the head lamp by using a second difference value between the average height value and the reference height of the front suspensions.

The light irradiation angle of the head lamp may be adjusted upwardly or downwardly by the second difference value with respect to the front suspensions.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the embodiments of the disclosure, examples of which are illustrated in the accompanying drawings, wherein like reference numerals refer to like elements throughout. This specification does not describe all elements of the disclosed embodiments and detailed descriptions of what is well known in the art or redundant descriptions on substantially the same configurations have been omitted. The terms 'part', 'module', 'member', 'block' and the like as used in the specification may be implemented in software or hardware. Further, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the disclosure will be described in detail with reference to the accompanying drawings.

Figure 1:
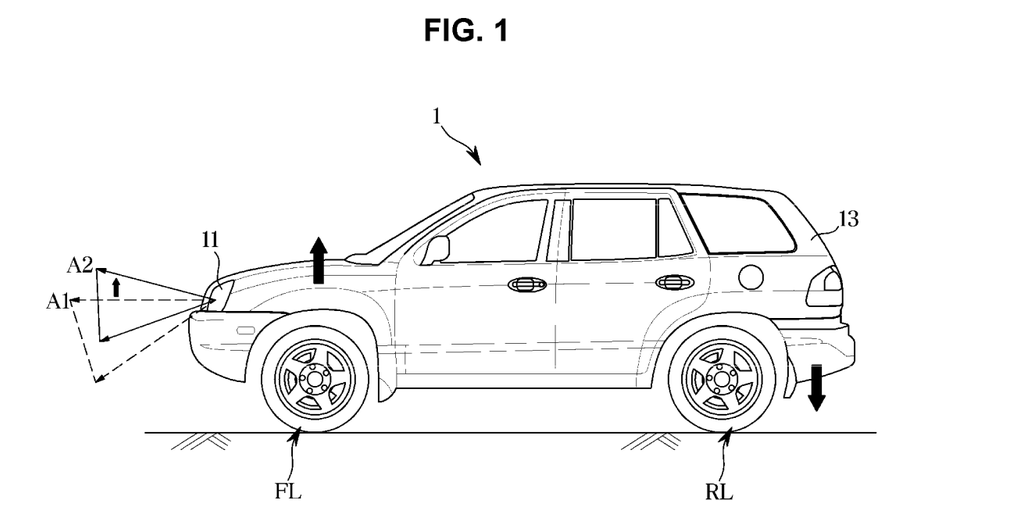
FIG. 1 is a view for explaining a situation in which a light irradiation direction of a headlamp rises.

FIG. 1 is a view for explaining a situation in which a light irradiation direction of a headlamp rises.

Referring to FIG. 1, a headlamp 11 of a vehicle 1 may irradiate light forward. The vehicle 1 may include a left front (FL) wheel, a right front (FR) wheel, a left rear (RL) wheel, and a right rear (RR) wheel. The number of wheels may be changed according to a type of the vehicle 1. A suspension 120 is coupled to each of the FL and FR wheels and the RL and RR wheels of the vehicle 1. At least one suspension 120 may be coupled to each of FL, FR, RL and RR wheels. Accordingly, the vehicle 1 includes a plurality of suspensions 120.

The plurality of suspensions 120 is provided between the wheels and a vehicle body of the vehicle 1, and serves to support the vehicle body. When the vehicle 1 is loaded with cargo, a vehicle height may be adjusted by adjusting a height of the suspension 120. The plurality of suspension 120 may be, for example, an air suspension. The air suspension is a suspension device using air pressure.

The suspension 120 may be provided on each of the FL and FR wheels and the RL and RR wheels of the vehicle 1. At least one suspension 120 may be connected to each wheel FL, FR, RL, and RR. The suspensions connected to the FL and FR wheels may be referred to as a front suspension, and the suspensions connected to the RL and RR wheels may be referred to as a rear suspension. The front left suspension may be referred to as a first suspension 121, the front right suspension may be referred to as a second suspension 122, the rear left suspension may be referred to as a third suspension 123, and the rear right suspension may be referred to as a fourth suspension 124.

A suspension sensor 130 may detect the height of the suspension 120. The suspension sensor 130 may be provided in each of the plurality of suspensions 120. The front left suspension sensor may be referred to as a first suspension sensor 131, the front right suspension sensor may be referred to as a second suspension sensor 132, the rear left suspension sensor may be referred to as a third suspension sensor 133, and the rear right suspension sensor may be referred to as a fourth suspension sensor 134, respectively.

A light irradiation angle of the headlamp 11 is basically set so that light is irradiated toward the ground and in front of the vehicle 1. In other words, the headlamp 11 is set to irradiate light in a reference direction (direction A1) parallel to the ground. The light irradiation angle of the headlamp 11 may be defined as an angle formed by a line parallel to the ground and a light irradiation direction. A reference irradiation angle of the headlamp 11 may be 0 degrees. This is to make it possible to identify an object in front while not obstructing a field of view of a driver of the opposite vehicle.

However, as described above, when an excessively heavy load is loaded in a trunk 13 located at the rear of the vehicle 1, an imbalance in vehicle posture in which the front of the vehicle body is raised and the rear of the vehicle body is lowered may occur. Due to the heavy cargo being loaded in the trunk 13, the correction capability of the suspension 120 for correcting the vehicle height may exceed the limit thereof. As a result, the front height of the vehicle 1 may be higher than the rear height of the vehicle 1.

As the front of the vehicle body is raised, the position of the headlamp 11 also rises with respect to the ground, so that the light irradiation direction of the headlamp 11 may rise in a direction A2. In other words, a phenomenon such as an increase in the light irradiation angle of the headlamp 11 may occur. In this case, the light emitted from the headlamp 11 may not only interfere with a field of view of the opposite driver, but also fail to illuminate the road surface, thereby causing an accident.

Figure 2:
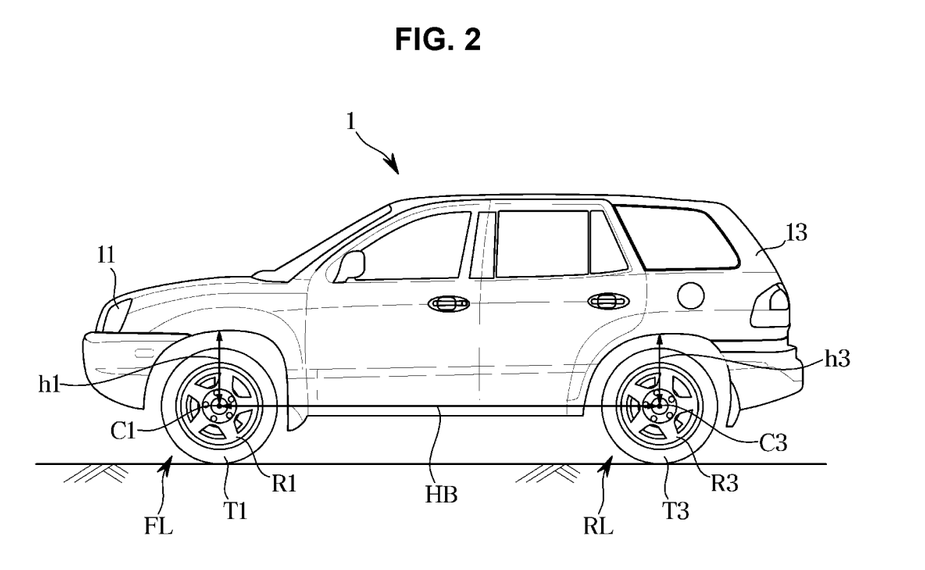
FIGS. 2 and 3 are views for explaining an adjustment of a vehicle height by a suspension of the vehicle and a correction limit of the vehicle height according to an exemplary embodiment of the present disclosure.
Figure 3:
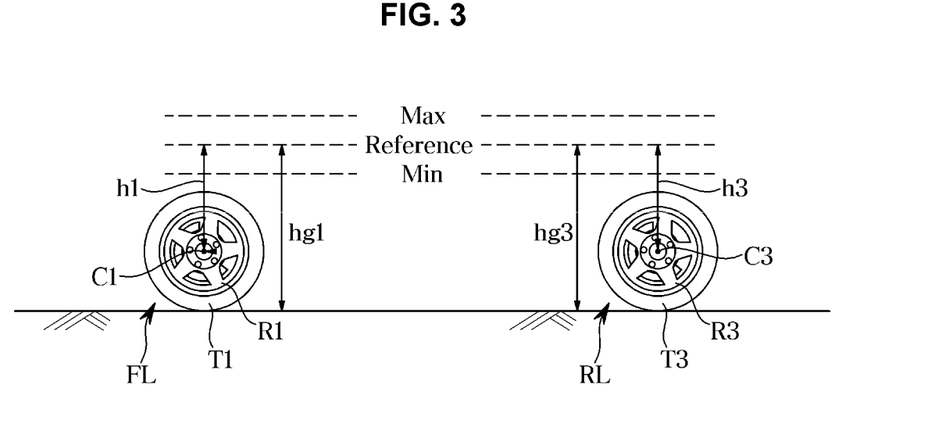

FIGS. 2 and 3 are views for explaining an adjustment of the vehicle height and a correction limit of the vehicle height by the suspension of the vehicle according to an exemplary embodiment of the present disclosure.

Referring to FIGS. 2 and 3, the FL, FR, RL and RR wheels of the vehicle 1 include a wheel rim and a tire mounted on the wheel rim, respectively. In other words, the FL wheel may include a first wheel rim R1 and a first tire T1, and the FR wheel may include a second wheel rim (not shown) and a second tire (not shown), the RL wheel may include a third wheel rim R3 and a third tire T3, and the RR wheel may include a fourth wheel rim (not shown) and a fourth tire (not shown). The first tire T1 and the second tire (not shown) may be referred to as front tires, and the third tire T3 and the fourth tire (not shown) may be referred to as rear tires.

The suspension 120 of the vehicle 1 is controlled based on the reference height set as a default. When the vehicle 1 is loaded with cargo, the height of the suspension 120 may be temporarily lower than the reference height. In this case, a controller 200 may control the suspension 120 so that the height of the suspension 120 rises to the reference height.

The height of the suspension 120 may be defined as a distance from a center of the wheel to a fender in a direction perpendicular to the ground. Taking the FL and RL wheels as an example, a distance h1 from the center of the FL wheel to the fender may be defined as the height of the front left suspension, and a distance h3 from the center of the RL wheel to the fender may be defined as the height of the rear left suspension. The height of the suspension 120 may also be referred to as a ride height. The distance between the center of the FL and FR wheels and the center of the RL and RR wheels is defined as a wheel base HB.

The height of the suspension 120 has a maximum (Max) height and a minimum (Min) height. The height of the suspension 120 may not be lower than the Min height and may not be higher than the Max height. If the height of the suspension 120 is lower than the reference height, the suspension 120 is controlled so that the suspension 120 ascends to the reference height. If the height of the suspension 120 is higher than the reference height, the suspension 120 is controlled so that the suspension 120 descends to the reference height.

However, in the case of the height h3 of the rear suspension 120 is lowered to the Min height due to a heavy cargo being loaded in the trunk 13 of the vehicle 1, the height h3 of the rear suspension 120 may not be restored to the reference height even if the control of the suspension 120 is performed. In other words, the correction capability of the rear suspension 120 for correcting the rear height of the vehicle may be out of the limit. In this case, an imbalance in vehicle posture in which the front of the vehicle body is raised and the rear of the vehicle body is lowered may occur. Accordingly, the light irradiation angle of the headlamp 11 may increase in the upward direction.

The vehicle 1 and a method of controlling the vehicle according to an embodiment of the disclosure may adjust the light irradiation angle of the headlamp 11 in consideration of the height change of the suspension 120 when a heavy load is loaded on the rear of the vehicle 1.

Furthermore, when a person gets in the vehicle 1 or when cargo is loaded in the trunk 13 of the vehicle 1, the height of the tire may also change.

Figure 4:
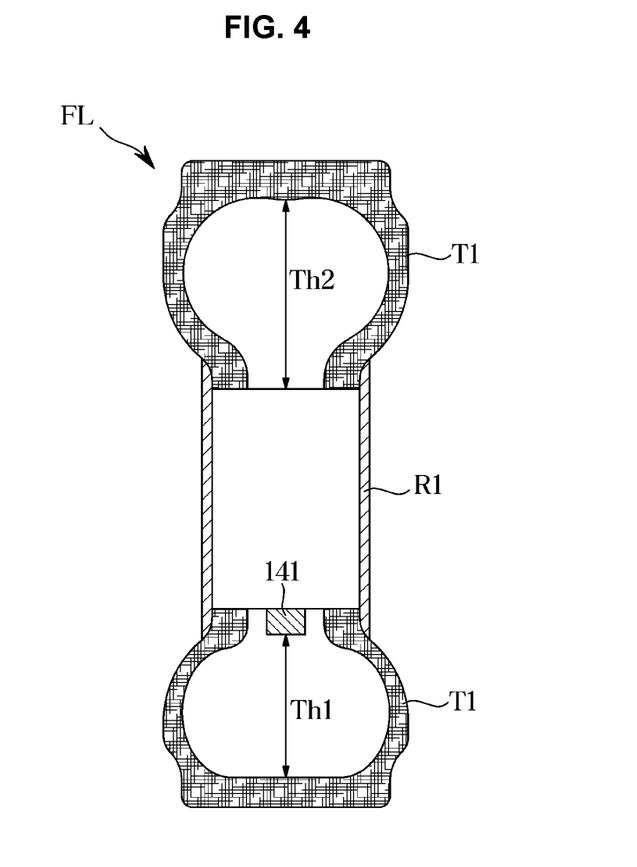
FIG. 4 is a view for explaining a change in the height of a tire when a cargo is loaded in a vehicle.

FIG. 4 is a view for explaining a change in the height of a tire when cargo is loaded in a vehicle.

Referring to FIG. 4, a tire sensor 140 may detect the height of the tire. The tire sensor 140 may be provided on each of the FL, FR, RL and RR wheels. The front left tire sensor may be referred to as a first tire sensor 141, the front right tire sensor may be referred to as a second tire sensor 142, the rear left tire sensor may be referred to as a third tire sensor 143, and the rear right tire sensor may be referred to as a fourth tire sensor 144, respectively. As shown in FIG. 4, taking the FL wheel as an example, the first tire sensor 141 may be mounted on the first wheel rim R1 and may be located inside the first tire T1.

As shown in FIG. 4, when looking at the cross-section of the FL wheel, a lower height Th1 of the tire T1, which is in contact with the ground when a person gets in the vehicle 1 or a cargo is loaded, may be measured to be lower than a upper height Th2 of the tire T1, which is not in contact with the ground. As the weight of the cargo loaded on the vehicle 1 increases, the height Th1 of the tire T1 in contact with the ground becomes lower.

As described above, in the case of that a heavy load is loaded in the trunk 13 located at the rear of the vehicle 1, the height of the front suspensions is higher than the height of the rear suspensions, so that the front of the vehicle body is lifted. As a result, the tire heights of the RL and RR wheels may decrease and the tire heights of the FL and FR wheels may increase. Considering both the tire height and the suspension height, the distance from the ground to the front fender is greater than the distance from the ground to the rear fender. In this case, the light irradiation angle of the headlamp 11 may further increase in the upward direction.

The vehicle 1 and a method of controlling the vehicle according to an embodiment of the disclosure may adjust the light irradiation angle of the headlamp 11 in consideration of both the height change of the tire and the height change of the suspension 120 when a heavy load is loaded on the rear of the vehicle 1.

Figure 5:
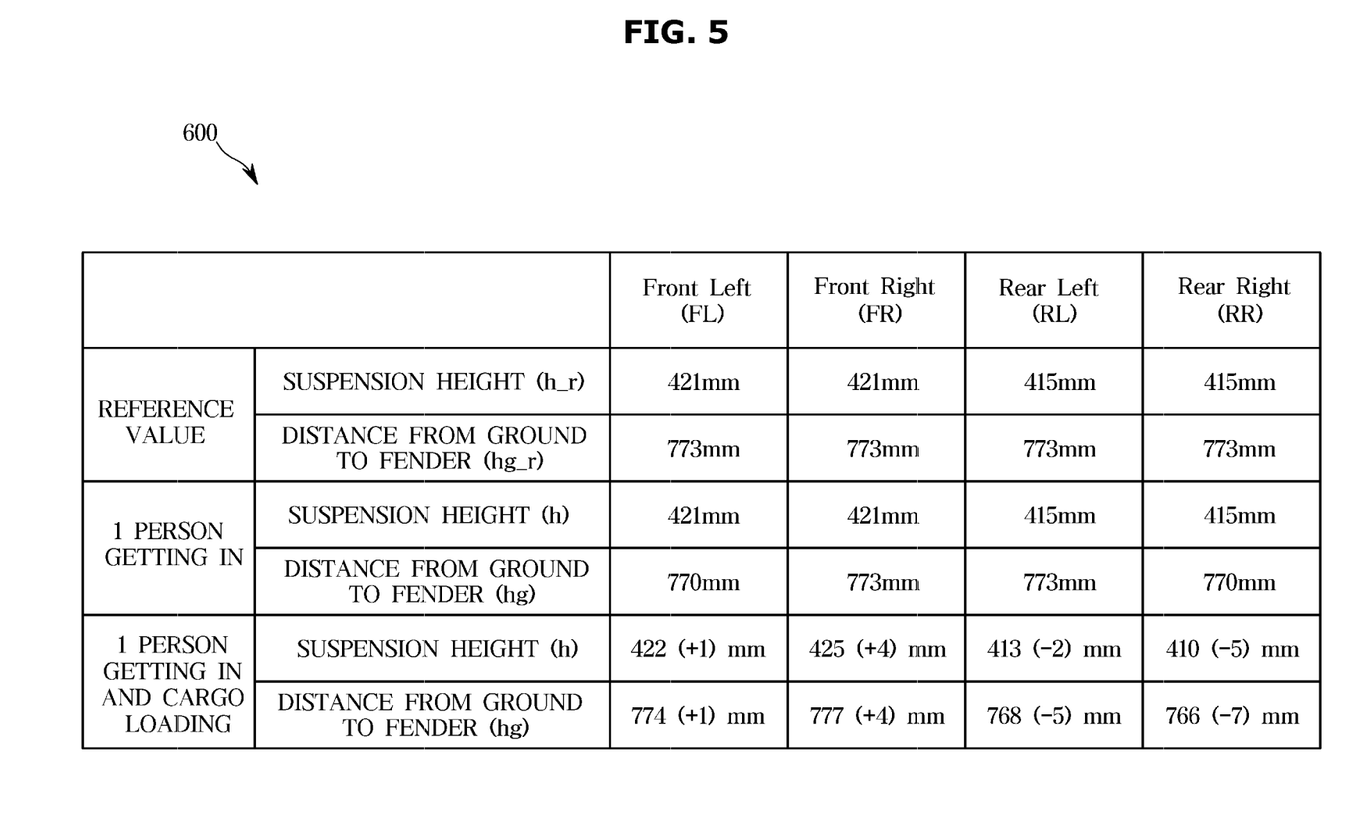
FIG. 5 is a table showing experimental data regarding vehicle heights measured in various experimental situations.

FIG. 5 is a table showing experimental data regarding vehicle heights measured in various experimental situations.

Referring to FIG. 5, the suspension 120 of the vehicle 1 is controlled based on the reference height set as a default. The reference height h_r of each of the plurality of suspensions 120 connected to the respective FL, FR, RL and RR wheels may vary depending on a design. For example, the reference height (e.g., 421 mm) of the front suspensions connected to the FL and FR wheels may be set higher than the reference height (e.g., 415 mm) of the rear suspensions connected to the RL and RR wheels.

A reference distance hg_r from the ground to the fender may be applied equally to both the front fender and the rear fender. In other words, the reference distance from the ground to the front fender (e.g., 773 mm) and the reference distance from the ground to the rear fender (e.g., 773 mm) may be set to be the same. The reference distance hg_r from the ground to the fender may vary depending on the specifications of the tires mounted on the FL, FR, RL and RR wheels.

As an experimental example, when a person rides on the front left seat of the vehicle 1 or a cargo is loaded, the height of the first suspension 121 located on the front left side of the vehicle 1 becomes temporarily lower than the reference height. As shown in table 600, the controller 200 controls the first suspension 121 located on the front left side of the vehicle 1 to maintain the height of the first suspension 121 to the reference height (e.g., 421 mm). All of the second suspension 122 located on the front right, the third suspension 123 located on the rear left, and the fourth suspension 124 located on the rear right are also controlled to maintain the reference height.

Furthermore, as the tire is pressed due to riding of a person in the front left seat of the vehicle 1 or loading of a cargo, the distance from the ground to the front left fender (e.g. 770 mm) becomes smaller than the reference value (e.g. 773 mm). However, since differences between the distances from the ground to each fender, which appear when a person rides on a seat inside the vehicle 1 or when a cargo is loaded, is quite small, the light irradiation angle of the headlamp 11 is not significantly affected.

As another experimental example, when a heavy cargo is additionally loaded in the trunk 13 located at the rear of the vehicle 1, an imbalance in vehicle posture in which the front of the vehicle body is raised and the rear of the vehicle body is lowered occurs. As shown in Table 600, the height of the third suspension 123 on the rear left is lowered to 413 mm, which is lower than the reference height by 2 mm, and the height of the fourth suspension 124 on the rear right is lowered to a lower 410 mm, which is lower than the reference height by 5 mm. The height of the first suspension 121 on the front left is increased to 422 mm, and the height of the second suspension 122 on the front right is increased to 425 mm. Although the height control of the rear suspensions 123 and 124 is performed, the heights of the rear suspensions 123 and 124 is not restored to the reference height due to the heavy load. Accordingly, a height change value of the first suspension 121 is determined to be 1 mm, and the height change value of the second suspension 122 is determined to be 4 mm.

Furthermore, as the amount of height change of each tire varies, a difference occurs in the distance from the ground to each fender. The distance from the ground to the rear left fender is decreased to 768 mm, and the distance from the ground to the rear right fender is decreased to 766 mm. The distance from the ground to the front left fender is increased to 774 mm, and the distance from the ground to the front right fender is increased to 777 mm. Accordingly, the height change value of the left front tire is determined to be 1 mm, and the height change value of the right front tire is determined to be 4 mm.

As a result, a problem that the light irradiation angle of the head lamp 11 increases in the upward direction occurs. To solve such a problem, the disclosure adjusts the light irradiation angle of the headlamp 11 by using the height value of the suspension 120. Furthermore, the disclosure adjusts the light irradiation angle of the headlamp 11 by further considering the tire height. Hereinafter, a method for adjusting the light irradiation angle of the headlamp 11 will be described.

Figure 6:
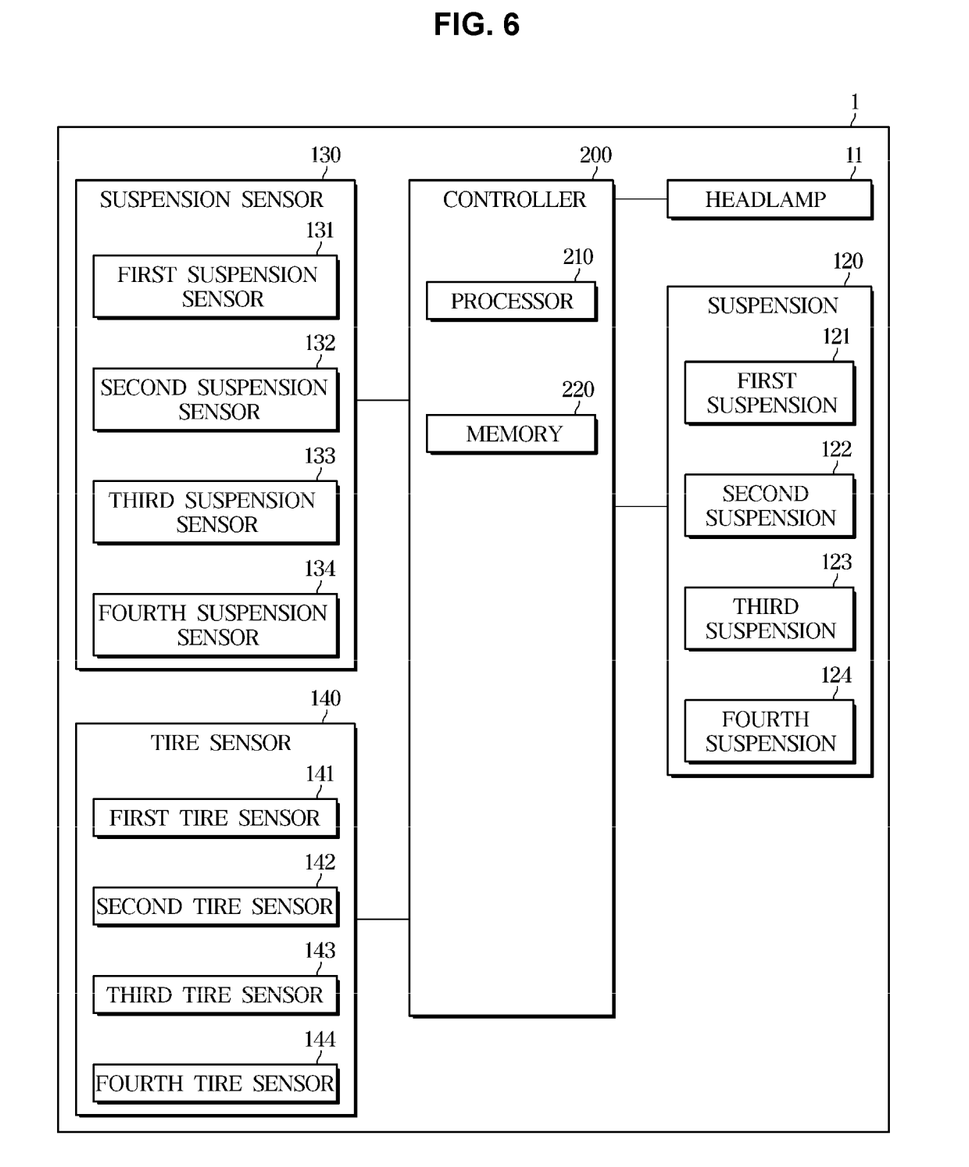
FIG. 6 shows control configurations of a vehicle according to an exemplary embodiment of the present disclosure.

FIG. 6 shows control configurations of a vehicle according to an exemplary embodiment of the present disclosure.

Referring to FIG. 6, the vehicle 1 may include the headlamp 11, the suspension 120, the suspension sensor 130, and the controller 200. Furthermore, the vehicle 1 may further include the tire sensor 140. The controller 200 may be electrically connected to the electronic devices of the vehicle 1 and control operation of each electronic device.

The controller 200 may include a memory 220 in which programs, instructions, and/or applications related to the operation of the vehicle 1 are stored, and a processor 210 that executes programs stored in the memory 220. The processor 210 may include a logic circuit and an arithmetic circuit, and process data according to the programs/instructions provided from the memory 220 and generate a control signal according to the processing result. The memory 220 and the processor 210 may be integrated into one chip. Furthermore, the memory 220 and the processor 210 may be provided in physically separate locations. In addition, each of the memory 220 and the processor 210 may be provided in plural.

The memory 220 may include a non-volatile memory device such as a cache, a read only memory (ROM), a programmable ROM (PROM), an erasable programmable ROM (EPROM), an electrically erasable programmable ROM (EEPROM), and a flash memory. In addition, the memory 220 may include a volatile memory device such as a random access memory (RAM), and may include a storage medium such as a hard disk drive (HDD) or a CD-ROM. The type of the memory 220 is not limited to the exemplified ones.

The headlamp 11 may irradiate light to the front of the vehicle 1. The headlamp 11 may include a left headlamp provided at the front left side of the vehicle 1 and a right headlamp provided at the front right side of the vehicle 1. The controller 200 may independently control the left and right headlamps. The controller 200 may adjust the light irradiation angle of the headlamp 11 by using the height value of the suspension 120.

The suspension 120 is provided between the wheels and the vehicle body of the vehicle 1, and serves to support the vehicle body. The suspension 120 may be, for example, an air suspension. The air suspension is a suspension device using air pressure. The controller 200 may adjust the vehicle height by adjusting the height of the suspension 120.

The suspension sensor 130 may detect the height of the suspension 120. The controller 200 may receive the height value of each of the plurality of suspensions 120 from the suspension sensor 130. The controller 200 may adjust the light irradiation angle of the headlamp 11 by comparing height values of the plurality of suspensions 120 with a predetermined reference height.

The controller 200 may detect a Max height value among the height values of the front suspensions 121 and 122 based on at least one of the height values of the rear suspensions 123 and 124 being lower than the predetermined reference height. The controller 200 may adjust the light irradiation angle of the headlamp 11 by using first difference value between the Max height value among the height values of the front suspensions 121 and 122 and the reference height of the front suspensions 121 and 122. The controller 200 may adjust the light irradiation angle of the headlamp 11 downward by the first difference value with respect to the front suspensions 121 and 122.

Furthermore, the controller 200 may calculate an average height value of the front suspensions 121 and 122 based on the height values of the rear suspensions 123 and 124 being higher than or equal to the predetermined reference height. The controller 200 may adjust the light irradiation angle of the headlamp 11 by using a second difference value between the average height value of the front suspensions 121 and 122 and the reference height of the front suspensions 121 and 122. The controller 200 may adjust the light irradiation angle of the headlamp 11 upward or downward by the second difference value with respect to the front suspensions 121 and 122.

The tire sensor 140 may detect the height of the tire. The controller 200 may receive the height value of each of the tires from the tire sensor 140, compare a Max height value among the height values of the front tires with a predetermined reference height of the tires, and determine the height change value of the front tires. The controller 200 may adjust the light irradiation angle of the headlamp 11 by using the first difference value with respect to the front suspensions 121 and 122 and the height change values of the front tires. The controller 200 may adjust the light irradiation angle of the headlamp 11 downward by the sum of the first difference value with respect to the front suspensions 121 and 122 and the height change values of the front tires.

The above-described electronic devices may communicate with each other via a communication network (NT) for a vehicle. For example, the electronic devices of the vehicle 1 may exchange data with each other via a network such as, Ethernet, Media Oriented Systems Transport (MOST), Flexray, Controller Area Network (CAN), and/or Local Interconnect Network (LIN).

The vehicle 1 may further include other components in addition to the above-described components. For example, the vehicle 1 includes an engine and a transmission. The engine includes a cylinder and a piston, and may generate power for driving the vehicle 1. The transmission includes a plurality of gears, and may transmit power generated by the engine to the wheels. A braking device may decelerate the vehicle 1 or stop the vehicle 1 through friction against the wheels. A steering device may change a driving direction of the vehicle 1.

Furthermore, the vehicle 1 may further include an engine management system (EMS), a transmission control unit (TCU), an electronic brake control module, an electronic power steering (EPS) device, a body control module (BCM), and a driver assistance system (DAS).

Figure 7:
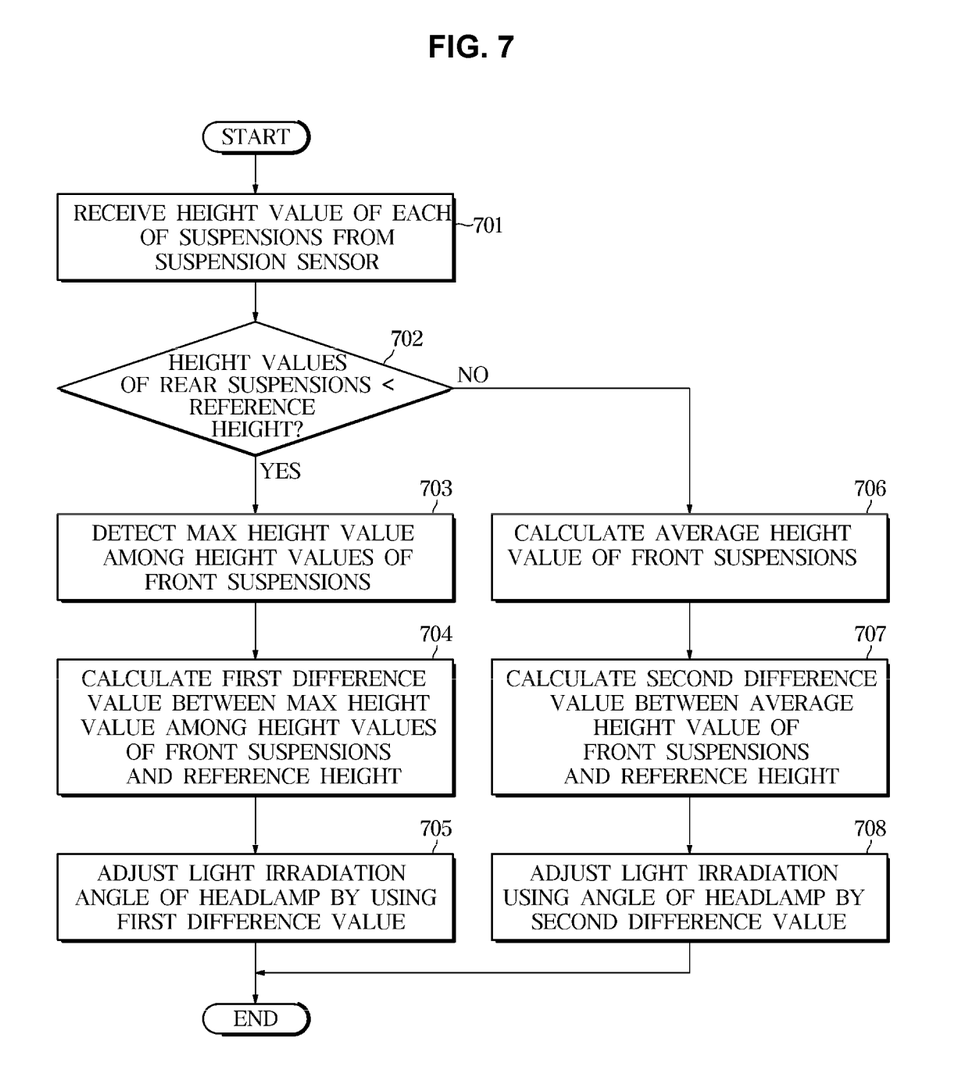
FIG. 7 is a flowchart illustrating a method of controlling the vehicle according to an exemplary embodiment of the present disclosure.

FIG. 7 is a flowchart illustrating a method of controlling a vehicle according to an exemplary embodiment of the present disclosure.

Referring to FIG. 7, the controller 200 may receive a height value of each of the plurality of suspensions 120 from the suspension sensor 130 (701). The controller 200 may compare the height values of the plurality of suspensions 120 with the predetermined reference height (702). The controller 200 may detect the Max height value among the height values of the front suspensions 121 and 122 based on that at least one of the height values of the rear suspensions 123 and 124 is lower than the predetermined reference height (703). Furthermore, the controller 200 may calculate the first difference value between the Max height value among the height values of the front suspensions 121 and 122 and the reference height of the front suspensions 121 and 122 (704).

The controller 200 may adjust the light irradiation angle of the headlamp 11 by using the first difference value between the Max height value among the height values of the front suspensions 121 and 122 and the reference height of the front suspensions 121 and 122 (705). The controller 200 may adjust the light irradiation angle of the headlamp 11 downward by the first difference value with respect to the front suspensions 121 and 122.

Furthermore, the controller 200 may calculate the average height value of the front suspensions 121 and 122 based on the height values of the rear suspensions 123 and 124 being higher than or equal to the predetermined reference height (706). The controller 200 may calculate the second difference value between the average height value of the front suspensions 121 and 122 and the reference height of the front suspensions 121 and 122 (707). The controller 200 may adjust the light irradiation angle of the headlamp 11 by using the second difference value between the average height value of the front suspensions 121 and 122 and the reference height of the front suspensions 121 and 122 (708). The controller 200 may adjust the light irradiation angle of the headlamp 11 upward or downward by the second difference value with respect to the front suspensions 121 and 122.

Figure 8:
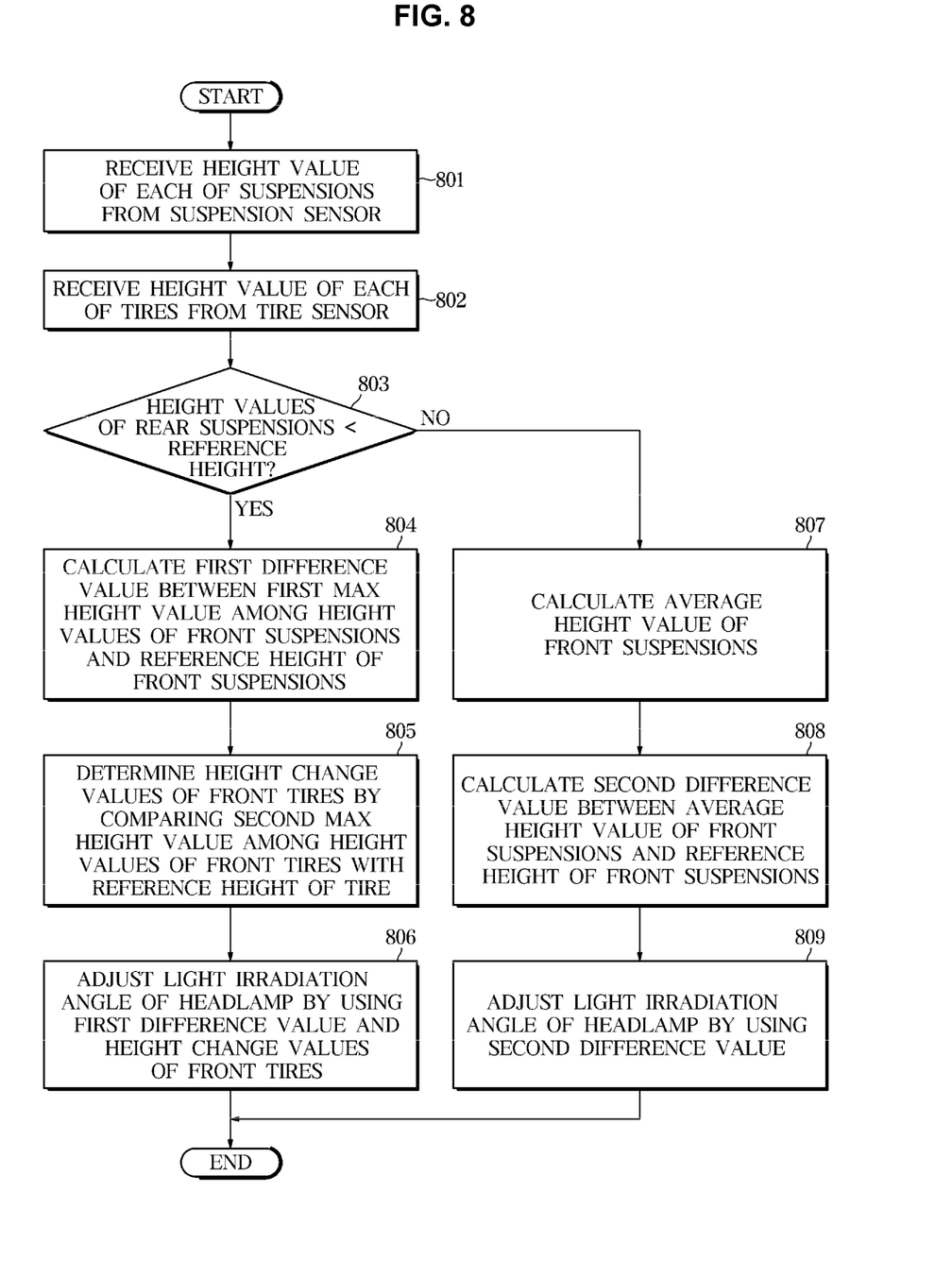
FIG. 8 is a flowchart illustrating a method of controlling a vehicle according to another exemplary embodiment of the present disclosure.

FIG. 8 is a flowchart illustrating a method of controlling the vehicle according to another exemplary embodiment of the disclosure.

Referring to FIG. 8, the controller 200 may receive a height value of each of the plurality of suspensions 120 from the suspension sensor 130 (801). Furthermore, the controller 200 may receive a height value of each of the tires from the tire sensor 140 (802).

The controller 200 may compare the height values of the plurality of suspensions 120 with the predetermined reference height (803). The controller 200 may calculate the first difference value between a first Max height value among the height values of the front suspensions 121 and 122 and the reference height of the front suspensions 121 and 122, based on at least one of the height values of the rear suspensions 123 and 124 being lower than the predetermined reference height (804).

Furthermore, the controller 200 may determine the height change values of the front tires by comparing a second Max height value among the height values of the front tires with the predetermined reference height of the tires (805). The controller 200 may adjust the light irradiation angle of the headlamp 11 by using the first difference value with respect to the front suspensions 121 and 122 and the height change values of the front tires (806). The controller 200 may adjust the light irradiation angle of the headlamp 11 downward by the sum of the first difference value with respect to the front suspensions 121 and 122 and the height change values of the front tires.

Furthermore, the controller 200 may calculate the average height value of the front suspensions 121 and 122, based on the height values of the rear suspensions 123 and 124 being higher than or equal to the predetermined reference height (807). The controller 200 may calculate the second difference value between the average height value of the front suspensions 121 and 122 and the reference height of the front suspensions 121 and 122 (808). The controller 200 may adjust the light irradiation angle of the headlamp 11 by using the second difference value between the average height value of the front suspensions 121 and 122 and the reference height of the front suspensions 121 and 122 (809). The controller 200 may adjust the light irradiation angle of the headlamp 11 upward or downward by the second difference value with respect to the front suspensions 121 and 122.

As is apparent from the above, the vehicle and the method of controlling thereof according to various embodiments of the disclosure may appropriately adjust the light irradiation angle of the headlamp even if the vehicle height is out of the correction limit by the suspension due to a heavy cargo being loaded at the rear of the vehicle. Therefore, the problem that the light irradiation direction of the headlamp rises due to a heavy cargo being loaded at the rear of the vehicle may be solved.

Furthermore, the vehicle and the method of controlling thereof according to various embodiments of the disclosure may adjust the light irradiation angle of the headlamp in consideration of the height change of the tires when a heavy cargo is loaded on the rear of the vehicle.

On the other hand, the above-described embodiments may be implemented in the form of a recording medium storing instructions executable by a computer. The instructions may be stored in the form of program code. When the instructions are executed by a processor, a program module is generated by the instructions so that the operations of the disclosed embodiments may be carried out. The recording medium may be implemented as a computer-readable recording medium.

The computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although embodiments of the disclosure have been shown and described, it would be appreciated by those having ordinary skill in the art that changes may be made in these embodiments without departing from the principles and spirit of the disclosure, the scope of which is defined in the claims and their equivalents.

What is claimed is:

1. A vehicle, comprising:
a headlamp configured to irradiate light forward;
a plurality of suspensions including front suspensions and rear suspensions, each front suspension being coupled to a corresponding front wheel of a vehicle and each rear suspension being coupled to a corresponding rear wheel of the vehicle;
a plurality of suspension sensors configured to detect a height of each of the plurality of suspensions, respectively;
a plurality of tire sensors configured to detect a height of each tire of the vehicle, respectively; and
a controller electrically connected to the headlamp, the plurality of suspensions, the plurality of suspension sensors, and the plurality of tire sensors;
wherein the controller is configured to:
receive a height value of each suspension of the plurality of suspensions from a corresponding suspension sensor of the plurality of suspension sensors,
receive a height value of each of the tires from the plurality of tire sensors,
determine height change values of front tires by comparing a maximum height value among the height values of the front tires with a predetermined reference height of the front tires, and
adjust a light irradiation angle of the headlamp by using the first difference value with respect to the front suspensions and the height change values of the front tires.

2. The vehicle of claim 1, wherein the controller is further configured to:
detect a maximum height value among the height values of the front suspensions based on at least one of the height values of the rear suspensions being lower than the predetermined reference height, and
adjust the light irradiation angle of the headlamp by using the first difference value between the maximum height value among the height values of the front suspensions and the predetermined reference height of the front suspensions.

3. The vehicle of claim 2, wherein the controller is further configured to:
adjust the light irradiation angle of the headlamp downward by an amount corresponding to the first difference value with respect to the front suspensions.

4. The vehicle of claim 1, wherein the controller is further configured to:
adjust the light irradiation angle of the headlamp downward by the sum of the first difference value with respect to the front suspensions and the height change values of the front tires.

5. The vehicle of claim 1, wherein the controller is further configured to:
calculate an average height value of the front suspensions based on the height values of the rear suspensions being higher than or equal to the predetermined reference height, and
adjust the light irradiation angle of the headlamp by using a second difference value between the average height value and the reference height of the front suspensions.

6. The vehicle of claim 5, wherein the controller is further configured to:
adjust the light irradiation angle of the headlamp upward or downward by the second difference value with respect to the front suspensions.

7. A method of controlling a vehicle headlamp, the method comprising:
receiving a height value of each suspension of a plurality of suspensions from a corresponding suspension sensor of a plurality of suspension sensors;
receiving height values of front tires of a vehicle from a plurality of tire sensors,
determining height change values of the front tires by comparing a maximum height value among the height values of the front tires with a predetermined reference height of the front tires; and
adjusting a light irradiation angle of a headlamp by using a first difference value with respect to front suspensions and the height change values of the front tires.

8. The method of claim 7, wherein the adjusting the light irradiation angle of the headlamp further comprises:
detecting a maximum height value among the height values of the front suspensions of the plurality of suspensions based on at least one of the height values of rear suspensions of the plurality of suspensions being lower than the predetermined reference height, and adjusting the light irradiation angle of the headlamp by using the first difference value between the maximum height value among the height values of the front suspensions and the reference height of the front suspensions.

9. The method of claim 8, wherein the light irradiation angle of the headlamp is adjusted downward by the first difference value with respect to the front suspensions.

10. The method of claim 7, wherein the light irradiation angle of the headlamp is adjusted downward by the sum of the first difference value with respect to the front suspensions and the height change values of the front tires.

11. The method of claim 7, wherein the adjusting the light irradiation angle of the headlamp further comprises:

calculating an average height value of front suspensions of the plurality of suspensions based on the height values of rear suspensions of the plurality of suspensions being higher than or equal to the predetermined reference height, and adjusting the light irradiation angle of the headlamp by using a second difference value between the average height value and the reference height of the front suspensions.

12. The method of claim 11, wherein the light irradiation angle of the headlamp is adjusted upwardly or downwardly by the second difference value with respect to the front suspensions.

* * * * *